D. & S. K. Flanders,
Fly Trap,
No. 10,801. Patented Apr. 18, 1854.

UNITED STATES PATENT OFFICE.

DAVID FLANDERS AND SAMUEL K. FLANDERS, OF PARISHVILLE, NEW YORK.

FLY-TRAP.

Specification of Letters Patent No. 10,801, dated April 18, 1854.

*To all whom it may concern:*

Be it known that we, DAVID FLANDERS and SAMUEL K. FLANDERS, of Parishville, in the county of St. Lawrence and State of New York, have invented a new and useful Implement or Trap for Catching Flies; and we do hereby declare that the following is a full, clear, and exact description of the construction and operation of the same, reference being had to the annexed drawings, making a part of this specification, in which—

Figure 2:
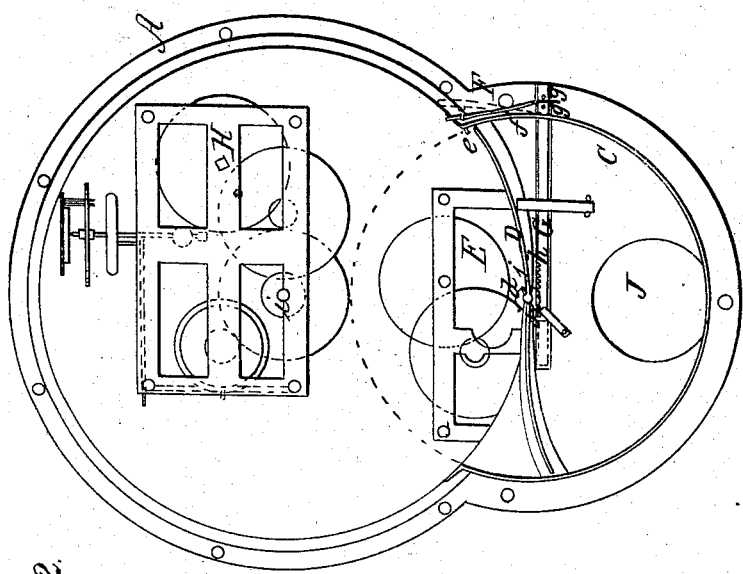
Figure 3:
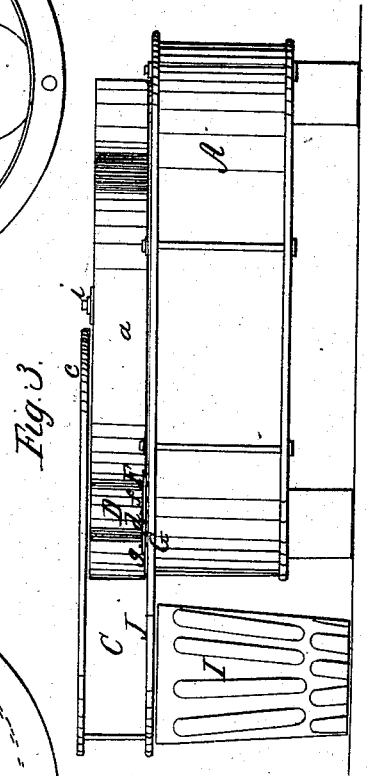
Figure 1:
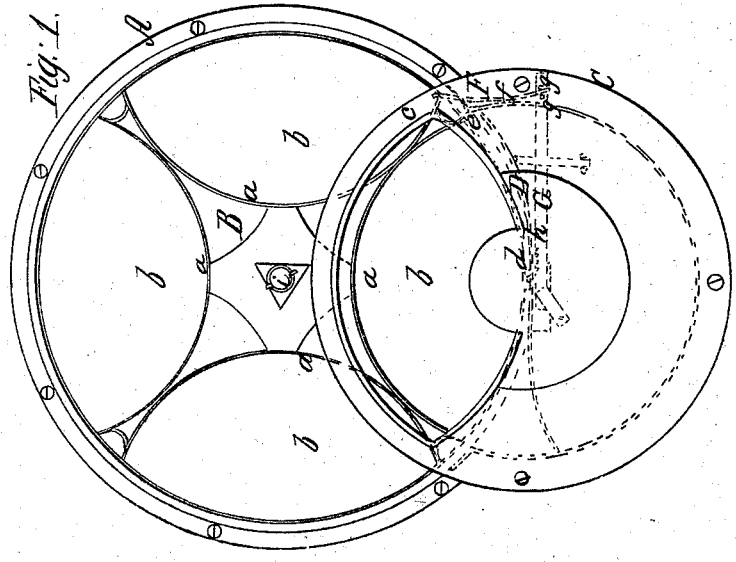

Figure 1, is a plan or top view of the trap. Fig. 2, is a plan or top view of ditto, the rotating disk and the top of the wiper box being removed. Fig. 3, is a side view of ditto, a portion of the curb or side of the wiper box being removed.

Similar letters of reference indicate corresponding parts in the several figures.

This invention relates to a new and useful implement or trap for catching flies; and consists in having a horizontal circular rotating disk divided on its upper surface by four upright ledges into four sections, which, as the disk rotates, pass in succession underneath a portion of a circular cover or top of a box, which contains a wiper that sweeps the surface of the sections and throws the flies into the box behind the wiper. The sections on the disk are baited, in order to attract the flies upon them, and a glass vessel containing water is placed underneath an aperture in the bottom of the wiper box, into which the flies fall. Motion is communicated to the disk and wiper by clock machinery or its equivalent, as will be hereafter explained.

To enable others skilled in the art to fully understand and construct our invention, we will proceed to describe its construction and the manner in which it operates.

A, represents a circular box of suitable dimensions, on the upper part of which is a disk, B, having upon its upper surface, four upright ledges, (a), (a), (a), (a), which are curved inward, or in a reverse direction to the edge of the disk, B, the ends of said ledges terminating at the edge of the disk, see Fig. 1. These ledges divide the disk B into four sections, (b), (b), (b), (b).

C, is a box of segmental form, placed at the side of the disk, B, the bottom of the box, C, being "flush" or even with the disk. The cover or top, (c), of the box, C, is a true circle and projects over the disk, B, at a distance equal to the breadth of one of the sections, (b), or a little more than this. This is shown clearly in Fig. 1.

At the edge of the disk, B, and box, C, there is a wiper, D, see Figs. 2 and 3 and dotted lines in Fig. 1. This wiper is a metal strip, placed edgewise in the box, C, and working upon a shaft, (d), which is attached at the center of the wiper. The wiper is of such a height as to correspond with the depth of the box, C, see Fig. 3. Upon the shaft, (d), of the wiper and directly underneath the wiper there are two teeth, (j), (j), which project at opposite points from the shaft, (d), see Fig. 2. The use of these teeth will be presently shown.

The shaft, (d), of the wiper, D, is attached to or is a portion of the "strike" movement, E, of an ordinary clock, see Fig. 2, and the stroke movement causes the wiper to rotate when liberated from a catch lever, F, see Fig. 2 and dotted lines in Fig. 1. This catch lever is at one side of the box, C, and has a small projection, (e), which hooks over one end of the wiper. The fulcrum of the catch lever is at, (f), and the outer end of the catch lever fits between pins, (g), (g), attached to one end of a bar, G, the opposite end of which is provided with teeth, (h), near the shaft, (d), of the wiper.

H, is the time movement of a clock, and the disk, B, is suspended upon or attached to a shaft, (i), of the movement. This movement, H, causes the disk, B, to rotate.

I, is a glass vessel, which is filled with a requisite quantity of water and placed underneath an aperture, J, in the bottom of the box, C, as shown in Fig. 3.

Operation: The time and strike movements are wound up and the sections, (b), (b), (b), (b), properly baited. The implement is then placed in the desired spot, and as the disk, B, rotates the sections, (b), will pass in succession underneath the cover, (c), of the box, C. When one of the sections, (b), is directly underneath the cover, (c), of the box, C, the ends of the ledges, (a), will have moved back the catch lever, F, and freed the wiper from the projection (e). When the catch lever was thrown back, the bar, G, was thrown farther back, or past the shaft, (d), of the wiper, as shown by dotted lines, Fig. 2. When the wiper is freed from the catch lever, it rotates, owing to the movement, E, and sweeps the surface of the section, throwing all the flies upon the surface of the section into the box, C, the wiper making one revolution and a half, and is then stopped by the catch lever. The teeth (*j*), (*j*), on the shaft, (*d*), catch into the teeth, (*h*), on the bar, G, and the bar, G, and catch lever, F, are thrown back to their original position, as the shaft, (*d*), rotates, by the time one revolution and a half of the wiper is made. Thus the sections pass under the cover of the box, C, and the flies swept off their surfaces. The two movements are wound up with a key similar to an ordinary clock.

It is intended that the disk, B, should move or rotate gradually, so that the flies will alight upon the sections and remain upon them till the sections pass under the cover, (*c*). The surfaces of the sections may be corrugated or have indentations made in them to receive the bait, in order that it may not be swept off by the wiper.

The box, C, behind the wiper being dark, the flies as they are thrown into the box behind the wiper will, attracted by the light, pass down the aperture, J, and will fall into the vessel of water, I.

Having thus described our invention, what we claim as new, and desire to secure by Letters Patent, is:—

The horizontal circular rotating disk, B, divided on its upper surface by the ledges, (*a*), into sections, (*b*), which sections, as the disk rotates, pass underneath a cover, (*c*), of the box, C, which box contains a wiper, D, that sweeps or traverses over the surfaces of the sections, as they pass under the cover, (*c*), and throws the flies into the box, C, and behind the wiper, the disk, B, and wiper, D, being operated by clock machinery, or its equivalents, as herein shown and described.

DAVID FLANDERS.
SAMUEL K. FLANDERS.

Witnesses:
WILLIAM F. GURLEY,
O. S. COPELAND,
E. D. HURD.